United States Patent
Lin et al.

(10) Patent No.: US 8,392,703 B2
(45) Date of Patent: Mar. 5, 2013

(54) ELECTRONIC SIGNATURE VERIFICATION METHOD IMPLEMENTED BY SECRET KEY INFRASTRUCTURE

(75) Inventors: Tai-Hung Lin, Taipei (TW); Po-Yueh Hung, Taipei (TW)

(73) Assignee: Ares International Corporation, Taipei (TW)

( * ) Notice: Subject to any disclaimer, the term of this patent is extended or adjusted under 35 U.S.C. 154(b) by 808 days.

(21) Appl. No.: 12/485,158

(22) Filed: Jun. 16, 2009

(65) Prior Publication Data

US 2010/0318792 A1    Dec. 16, 2010

(51) Int. Cl.
*H01L 29/06* (2006.01)
*H04L 9/00* (2006.01)
*H04L 9/08* (2006.01)

(52) U.S. Cl. ........ 713/160; 380/277; 380/278; 380/279; 380/45

(58) Field of Classification Search .................. 713/160; 380/277–279, 45
See application file for complete search history.

(56) References Cited

U.S. PATENT DOCUMENTS

| | | | |
|---|---|---|---|
| 7,142,676 B1 * | 11/2006 | Hillier et al. | 380/278 |
| 2003/0172307 A1 * | 9/2003 | Henry et al. | 713/201 |

* cited by examiner

*Primary Examiner* — Peter Shaw
(74) *Attorney, Agent, or Firm* — Muncy, Geissler, Olds & Lowe, PLLC

(57) ABSTRACT

An electronic signature verification method implemented by SKI infrastructure adopts a secret key infrastructure (SKI) system for registering a secret key and issuing a signature key and a verification key. After a signer has completed a signature, a signature data, a verification data and a verification key encrypted by the secret key of a signature verification unit are sent to a recipient. After the recipient has received the data, a user needs to send the verification data and the encrypted verification key to a signature verification unit if the user wants to confirm the signature on the signature data. The signature verification unit uses a secret key authorized by the SKI for the decryption to obtain the verification key and uses the verification key to verify the verification data and confirm the existence of the signature of the signature data, so as to authenticate the signature of the signature data.

19 Claims, 4 Drawing Sheets

ELECTRONIC SIGNATURE VERIFICATION METHOD IMPLEMENTED BY SECRET KEY INFRASTRUCTURE

BACKGROUND OF THE INVENTION

1. Field of the Invention

The present invention relates to an electronic signature, and more particularly to an electronic signature created by a secret key infrastructure (SKI) system.

2. Description of Prior Art

In the present digital era, most people are living in an environment with various different convenient electronic products. As the development of the Internet advances, our electronic life is promoted to a higher level.

Electronic products definitely give tremendous convenience to users, particularly when we use these electronic products together with the Internet, and these products allow us to do many things that have never been accomplished. "Knowing things in the whole wide world without stepping out your house" is no longer a dream anymore. In recent years, we can do things involving personal confidential data such as an electronic transaction and an electronic signature by going through registration, logon, and identity authentication procedures, in addition to the function of obtaining information on the Internet. In the past, we had to go out and handle these affairs in person, but we can do many of these matters via the Internet, and thus the Internet has reached its peak of utilization.

Although network applications including electronic transactions and electronic signatures are very convenient and popular, their practical use is closely related to personal confidential data. Thus, there are concerns on how to maintain the information security and verify a user's identity. At present, many applications of the Internet require a user to enter a password to confirm the user's identity, but unauthorized uses of a fixed password occur very often, or a password with a very low security is cracked by unauthorized persons easily. Therefore, the verification method based on the user's password is inappropriate and insufficient for electronic signatures. Obviously, an application capable of withstanding offline attacks is needed.

To overcome the aforementioned drawback, some designers and manufacturers proposed the famous public key infrastructure (PKI) system. The PKI system uses a pair of asymmetric matched public key and private key as the keys for encryption and decryption. All public keys submitted for an application are safe kept by a trusted third party, namely a certificate authority (CA). Any person who requires a verification document can submit an application to the CA to inquire a public key. After a first user encrypts a document by the user's private key, and a second user receives the document, the second user can file an application to request the CA for the safe kept public key of the first user in order to decrypt the document. If the decryption is successfully, then it shows that the document is encrypted by the first user. If the second user uses a public key of the first user kept by the CA to encrypt the document, and the first user is the only receiver of the document, then the only private key known by the first user can be used for the decryption.

The PKI system has the features of confidentiality and non-repudiation that catch the attention of the manufacturers in the industry, and thus the PKI system is applicable for electronic signatures. However, the systems of this sort require a high cost, such that a company without sufficient budget has to bear a risk and select a verification method with a relatively lower level of confidentiality and a cheaper cost.

In view of the aforementioned shortcomings of the prior art, the present invention provides an electronic signature verification method with a relatively lower cost to improve the security greatly.

SUMMARY OF THE INVENTION

It is a primary objective of the present invention to overcome the shortcomings of the prior art by providing an electronic signature verification method implemented by an existing secret key infrastructure (SKI) system which is used as a registration center for registering a secret key and an issuance center for issuing verification keys. Since the secret keys stored in the SKI must be accessed and used easily by users, therefore the secret keys are not powerful enough to counteract an offline attack. In a verification method of the present invention, a trusted third party acts as a signature verification center and adopts a powerful secret key protection to create a more powerful security mechanism.

Another objective of the present invention is to provide an electronic signature verification method implemented by the SKI infrastructure, wherein the signature verification key issued by the signature verification key issuance center adopts a double encryption, such that a receiver is unable to a verification key directly after a signed document is received, and the signed document is handled by a trusted third party signature verification center for a further verification.

The signature verification method of the present invention can provide a signature verification of a higher level of security than the original system in the existing hardware infrastructure, so that users can concurrently take care of the issues of a high cost and a low security.

To achieve the foregoing objectives, the present invention uses a secret key infrastructure (SKI) system to register a secret key and issue a signature verification key, such that after a signer has completed a signature, a signature data, a verification data and a verification key encrypted by a secret key of the signature verification unit are transmitted to a recipient, and after the recipient has received the data and wants to confirm the validity of the signature data, the verification data and the encrypted verification key are transmitted to a signature verification unit, and the signature verification unit decrypts the encrypted verification key by using a secret key authorized by the SKI, in order to obtain the verification key and verify the verification data by using the verification key for the confirmation of the validity of the signature data of the signature.

DETAILED DESCRIPTION OF THE INVENTION

The present invention is illustrated by a preferred embodiment and related drawings and described in details as follows.

Figure 1:
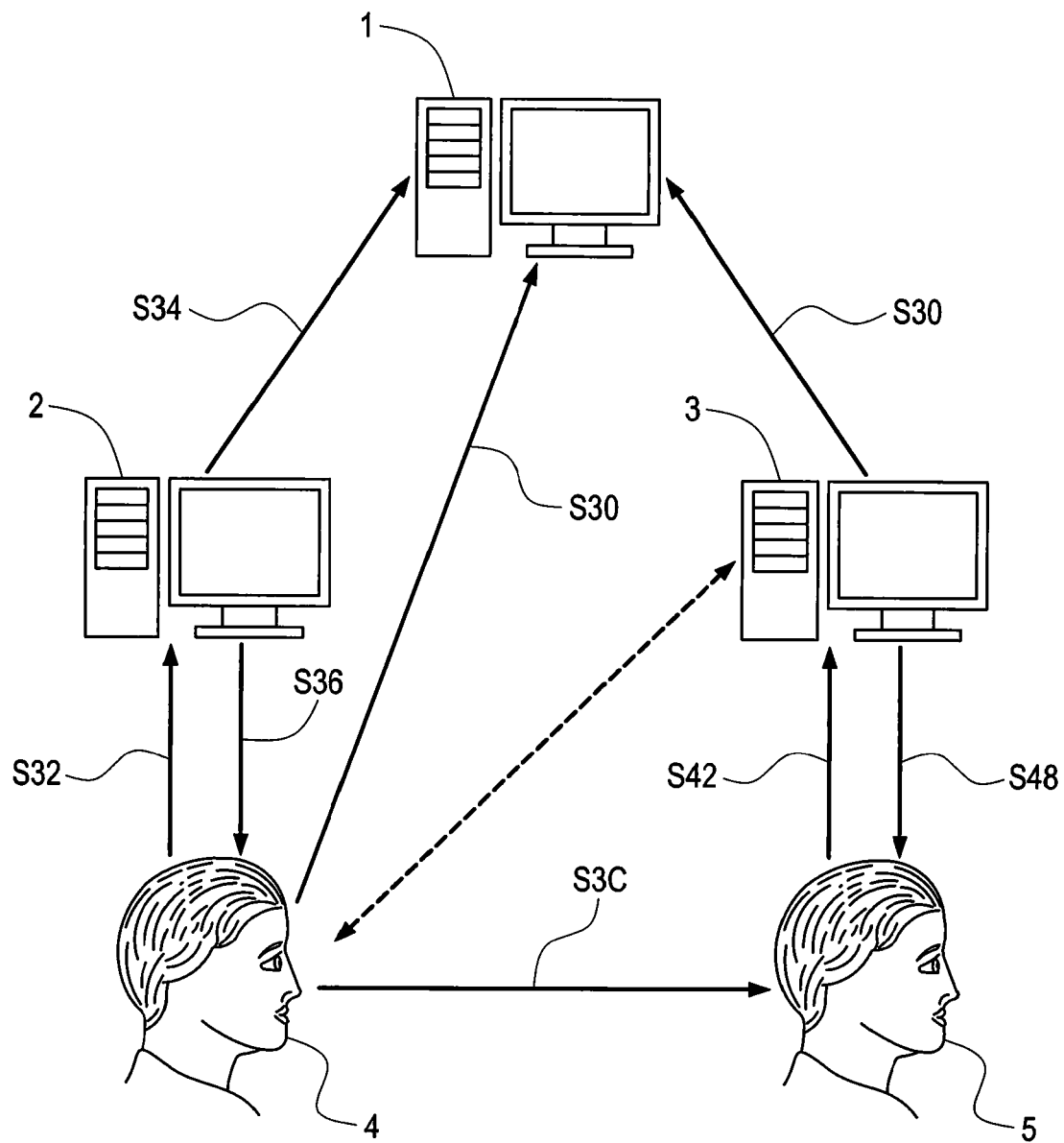
FIG. 1 is a schematic diagram of an electronic signature verification method implemented by a SKI infrastructure in accordance with the present invention.

With reference to FIG. 1 for a schematic diagram of an electronic signature verification method implemented by the SKI infrastructure in accordance with the present invention, the method is implemented by a secret key registration center 1, a signature verification key issuance center 2 and a signature verification center 3. These three centers are trusted third parties (TTP) with unquestionable fairness and trustfulness. An existing secret key infrastructure (SKI) system such as a Kerberos system or a Radius system acts as the secret key registration center 1 and the key issuance center 2, but such arrangement is used here for illustrating as an embodiment of the present invention, but not intended to limit the scope of the present invention.

Figure 3:
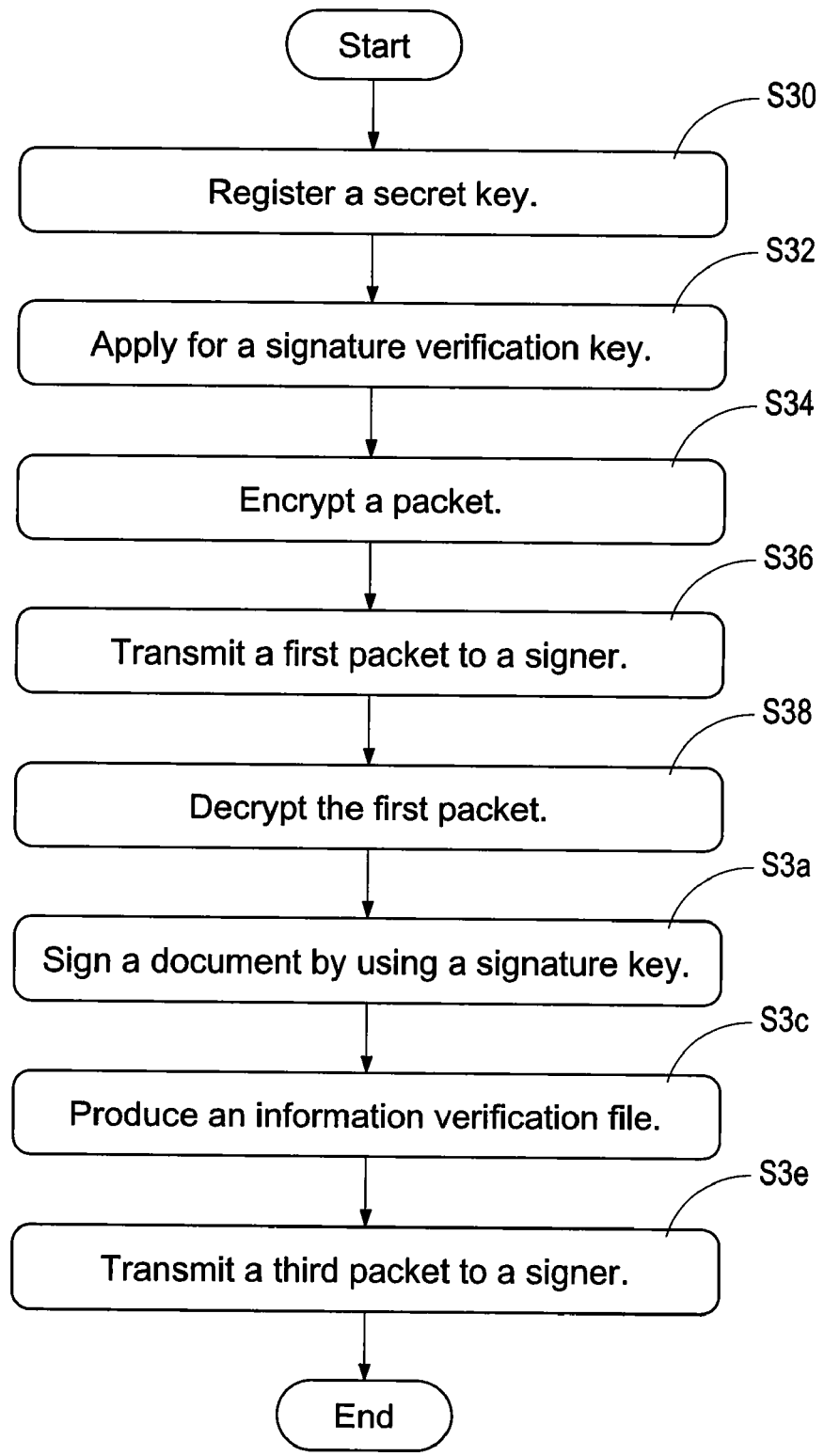
FIG. 3 is a flow chart of a signature process of an electronic signature verification method implemented by the SKI infrastructure in accordance with the present invention.

With reference to FIG. 3 for a flow chart of a signature process of an electronic signature verification method implemented by the SKI infrastructure in accordance with the present invention, a signer 4 and the verification center 3 register a first secret key 6a and a second secret key 6b to the registration center 1 (Step S30). The second secret key 6b registered by the verification center 3 can be a symmetric secret key or an asymmetric pair of public key and private key, but the present invention is not limited to such arrangement only.

Figure 2A:
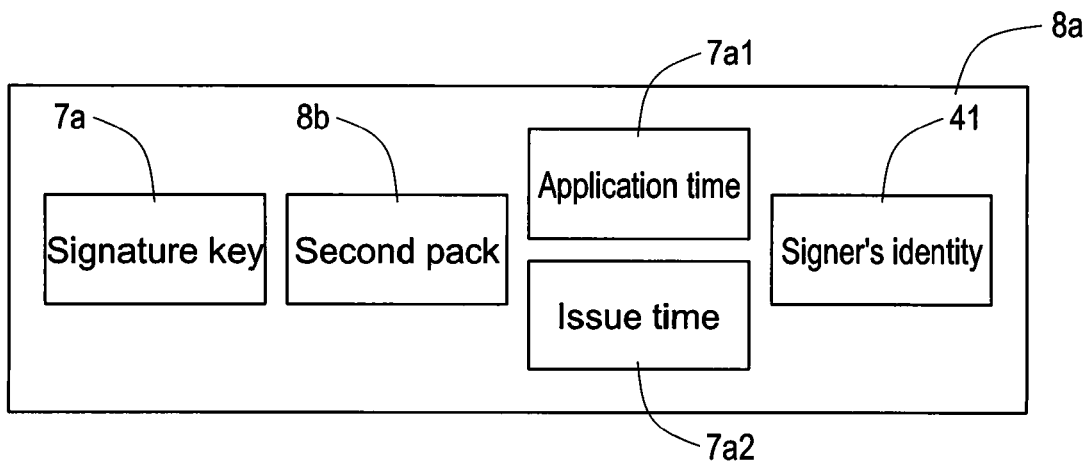
FIGS. 2a, 2b and 2c are schematic diagrams of packets of an electronic signature verification method implemented by the SKI infrastructure in accordance with the present invention.
Figure 2B:
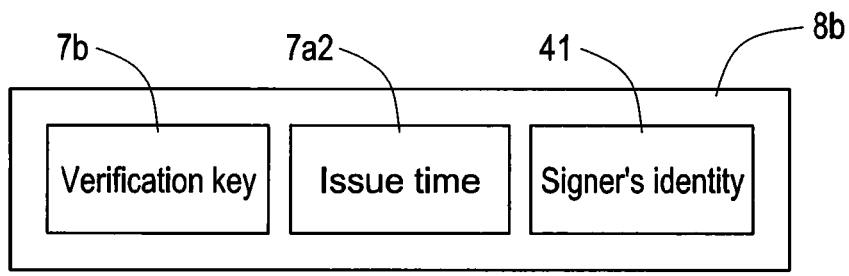
Figure 2C:
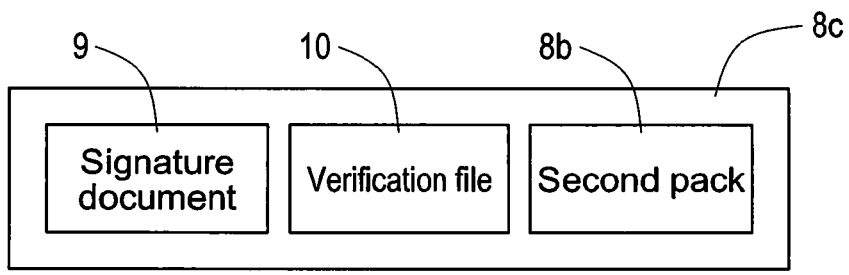

If the signer 4 wants to sign a document, the signer 4 applies for a key from the key issuance center 2 (Step S32). The issuance center 2 randomly generates a signature key 7a and a verification key 7b, and requests the registration center 1 for the first secret key 6a registered by the signer 4 and the second secret key 6b corresponding to the first secret key 6b according to the identity of the signer 4. The key issuance center 2 uses the second secret key 6b to encrypt a second packet 8b, and the first secret key 6a to encrypt a first packet 8a (Step S34). Finally, the first packet 8a is transmitted to the signer 4 (Step S36), wherein the first packet 8a comprises the signature key 7a and the second packet 8b, and the second packet 8b comprises the data of the verification key 7b, the issuance time of the signature key and the verification key 7b1 and the signer's identity 41. However, the contents of the packets can be modified according to actual requirements, and the contents of the packets are shown in FIGS. 2a, 2b and 2c, wherein the signature key 7a and the verification key 7b issued by the key issuance center 2 can be the same symmetric session key 3, or a pair of corresponding asymmetric session keys (or an ephemeral key pair), but the present invention is not limited to such arrangement only.

If the signer 4 receives the first packet 8a transmitted from the key issuance center 2, then the first secret key 6a provided by the registration center 1 is used for the decryption (Step S38) to obtain the signature key 7a and the second packet 8b. If the signature key 7a and the verification key 7b are a pair of asymmetric session keys, then the signature key 7a is used for signing the document (Step S3a) to produce a signed document 9. If the signature key 7a and the verification key 7b are same symmetric session key, then the signer 4 can use the signature key 7a to produce an information certification file 10 (Step S3c). Finally, the signer 4 transmits a third packet 8c including the document (or the signed document 9), the information certification file 10 (wherein the information certification file 10 will not be produced if the signed document 9 is produced) and the second packet 8b to a recipient 5 (Step S3e). After the recipient 5 receives the above, the signed document 9 or the information certification file 10 is used for verifying the validity of the signature.

It is noteworthy to point out that the first packet 8a can selectively include data such as the application time 7a1 and the issuance time 7a2 of the signature key and the verification key, the signer's identity 41, such that after the signer 4 has received and decrypted the first packet 8a, the signer 4 can send these data to the signature verification center 3 to verify the data directly, and the signature verification center 3 returns a verification result to the signer 4, so that the signer 4 can perform a test.

Figure 4:
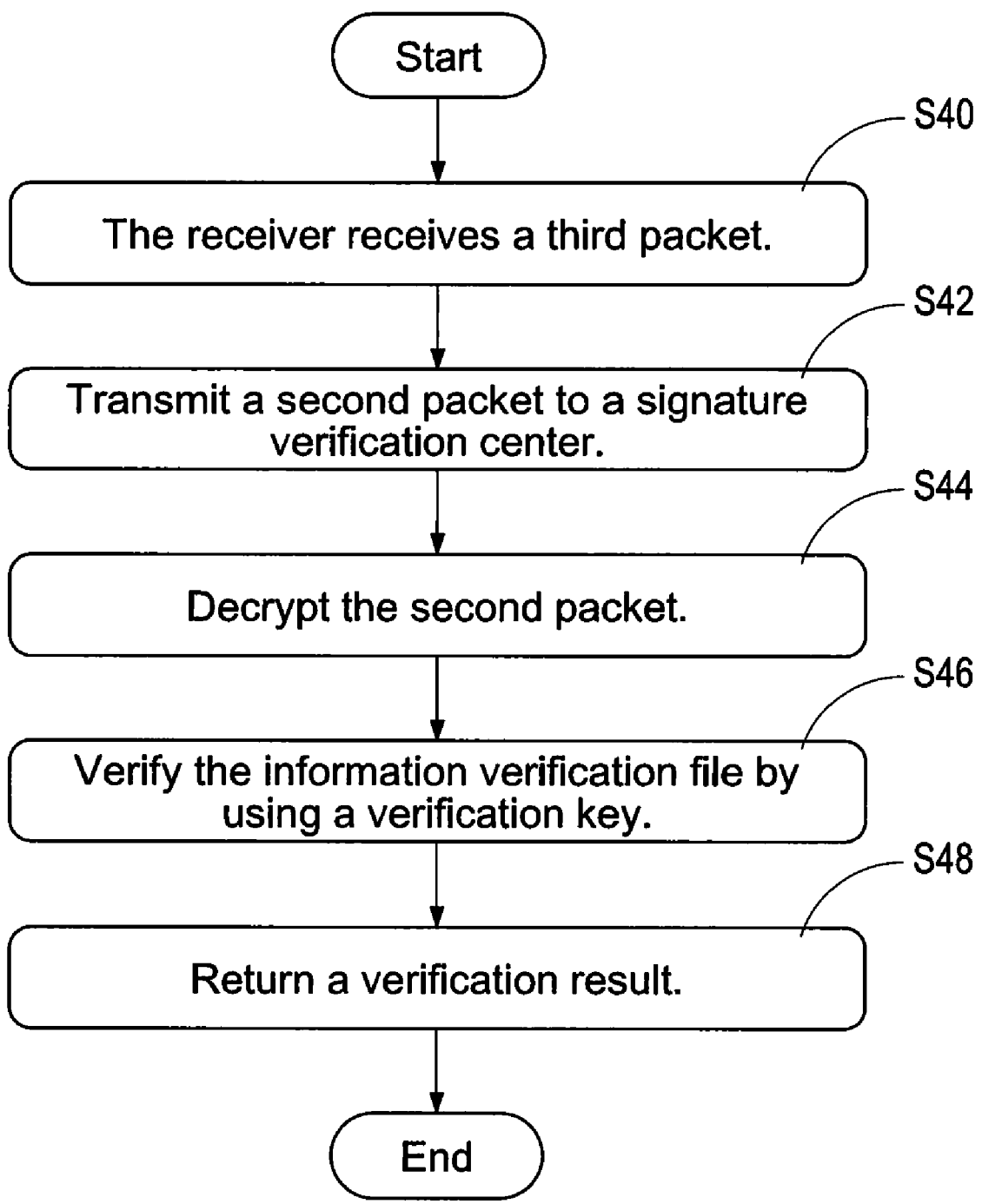
FIG. 4 is a flow chart of a verification process of an electronic signature verification method implemented by the SKI infrastructure in accordance with the present invention.

With reference to FIG. 4 for a flow chart of a signature verification process of an electronic signature verification method in accordance with the present invention, the recipient 5 receives the third packet 8c from the signer 4 (Step S40). If the recipient 5 wants to verify whether or not the signature is valid, the signed document 9 or the information certification file 10, and the second packet 8b will be transmitted to the verification center 3 (Step S42). After the verification center 3 has received the above, the second secret key 6b registered to the registration center 1 by the verification center 3 or a corresponding private key used for encrypting a public key of the second packet 8b is used to decrypt the second packet 8b to obtain the verification key 7b and the signature information (Step S44). The verification center 3 uses the verification key 7b to verify whether or not the signed document 9 or the information certification file 10 is valid (Step S46), and the verification center 3 is responsible for the validity of the signer's identity 41 of the signed document 9, wherein the verification center 3 verifies the signed document 9 or the information certification file 10 according to the types of the signature key 7a and the verification key 7b, since the data transmitted from the recipient 5 to the verification center 3 will not contain both of the signed document 9 and the information certification file 10 at the same time.

If a valid signature is confirmed, the signature information including the issuance time 7b1 of the signature key and the verification key issuance time 7b 1 and the signer's identity 41 will be returned to the recipient 5 (Step S48). If the verification center 3 receives unmatched signature information, the verification center 3 will not verify the signed document 9 or the information certification file 10, but it will directly return an error message to the recipient 5.

While the invention has been described by means of specific embodiments, numerous modifications and variations could be made thereto by those skilled in the art without departing from the scope and spirit of the invention set forth in the claims.

What is claimed is:

1. An electronic signature verification method, employing a secret key infrastructure (SKI) to act as a secret key registration center and a signature verification key issuance center, and a trusted third party to act as a signature verification center, and the method processing a document signed by a signer computer, and comprising:

(a) the signer computer registering a first secret key to the secret key registration center;

(b) the signature verification center registering a second secret key to the secret key registration center;

(c) the signer computer applying for a signature key and a verification key to the signature verification key issuance center;

(d) the signature verification key issuance center encrypting a second packet by the second secret key, and the second packet comprising the verification key;

(e) the signature verification key issuance center encrypting a first packet by the first secret key, and the first packet comprising the signature key and the second packet;

(f) the signature verification key issuance center transmitting the first packet to the signer computer;

(g) the signer computer using the signature key to sign a document to produce a signed document, after decrypting the first packet by using the first secret key;

(h) the signer computer transmitting a third packet to a recipient computer, and the third packet comprising the signed document and the second packet;

(i) the recipient computer transmitting the signed document and the second packet to the signature verification center;

(j) the signature verification center using the verification key to verify whether or not the signed document is valid, after decrypting the second packet by using the second secret key; and (k) the signature verification center returning a verification result to the recipient computer, wherein the secret key registration center, the signature verification key issuance center, and the signature verification center are implemented by computer servers physically separated from each other and the signer computer and the recipient computer are physically separated from each other and physically separated from the computer servers.

2. The electronic signature verification method of claim 1, wherein the signature verification key issuance center is acted by a Kerberos system or a Radius system.

3. The electronic signature verification method of claim 1, wherein the signature key and the verification key in the Step (c) are symmetric session keys.

4. The electronic signature verification method of claim 1, wherein the signature key and the verification key in the Step (c) are an asymmetric session key pair.

5. The electronic signature verification method of claim 1, wherein the first packet described in the Step (e) further comprises an issuance time of the signature key and the verification key and a signer's identity.

6. The electronic signature verification method of claim 5, further comprising a step (f1) after the Step (f) takes place, and in the Step (f1), the signer computer transmits the issuance time of the signature key and the verification key and the signer's identity to the signature verification center for verifying, after the first packet is decrypted.

7. The electronic signature verification method of claim 6, further comprising a step (f2) after the Step (f1) takes place, wherein in the Step (f2), the signature verification center returns a verification result to the signer computer.

8. The electronic signature verification method of claim 1, wherein the second packet described in the Step (d) further comprises an issuance time of the signature key and the verification key and a signer's identity.

9. The electronic signature verification method of claim 8, further comprising a step (j1) after the Step (j) takes place, wherein in the Step (j1), the signature verification center returns an invalid signature message to the recipient computer if there is an error of the issuance time of the signature key or the verification key or the signer's identity after the second packet is decrypted.

10. The electronic signature verification method of claim 9, wherein the Step (k) returns the issuance time of the signature key and the verification key and the signer's identity to the recipient computer after the signature document is verified to be valid.

11. The electronic signature verification method of claim 1, wherein the first packet as described in the Step (e) further includes an application time of the signature key and the verification key.

12. An electronic signature verification method, employing a secret key infrastructure (SKI) to act as a secret key registration center and a signature verification key issuance center, and a trusted third party to act as a signature verification center, and the method processing a document signed by a signer computer, and comprising:

(a) the signer computer registering a first secret key to the secret key registration center;

(b) the signature verification center registering a second secret key to the secret key registration center;

(c) the signer computer applying for a signature key and a verification key to the signature verification key issuance center;

(d) the signature verification key issuance center encrypting a second packet by the second secret key, and the second packet comprising the verification key;

(e) the signature verification key issuance center encrypting a first packet by the first secret key, and the first packet comprising the signature key and the second packet;

(f) the signature verification key issuance center transmitting the first packet to the signer computer;

(g) the signer computer using the signature key to create an information certification file, after decrypting the first packet by using the first secret key;

(h) the signer computer transmitting a third packet to a recipient computer, and the third packet comprising the document, the information certification file and the second packet;

(i) the recipient computer transmitting the information certification file and the second packet to the signature verification center;

(j) the signature verification center using the verification key to verify whether or not the information certification file is valid, after decrypting the second packet by using the second secret key; and (k) the signature verification center returning a verification result to the recipient computer;

wherein the secret key registration center, the signature verification key issuance center, and the signature verification centers are implemented by computer servers physically separated from each other, and the signer computer and the recipient computer are physically separated from each other and physically separated from the computer servers.

13. The electronic signature verification method of claim 12, wherein the first packet described in the Step (e) further comprises an issuance time of the signature key and the verification key and a signer's identity.

14. The electronic signature verification method of claim 13, further comprising a step (f1) after the Step (f) takes place, and in the Step (f1), the signer computer transmits the issuance time of the signature key and the verification key and the signer's identity to the signature verification center for verifying, after the first packet is decrypted.

15. The electronic signature verification method of claim 14, further comprising a step (f2) after the Step (f1) takes place, wherein in the Step (f2), the signature verification center returns a verification result to the signer computer.

16. The electronic signature verification method of claim 12, wherein the second packet described in the Step (d) further comprises an issuance time of the signature key and the verification key and a signer's identity.

17. The electronic signature verification method of claim 16, further comprising a step (j1) after the Step (j) takes place, wherein in the Step (j1), the signature verification center returns an invalid signature message to the recipient computer if there is an error of the issuance time of the signature key or the verification key or the signer's identity after the second packet is decrypted.

18. The electronic signature verification method of claim 17, wherein the Step (k) returns the issuance time of the signature key and the verification key and the signer's identity to the recipient computer after the information certification file is verified to be valid.

19. The electronic signature verification method of claim 12, wherein the first packet as described in the Step (e) further includes an application time of the signature key and the verification key.

* * * * *